(12) United States Patent
Kim

(10) Patent No.: US 11,871,036 B2
(45) Date of Patent: Jan. 9, 2024

(54) APPARATUS AND METHOD FOR COMPRESSING JPEG IMAGES

(71) Applicant: Korea University Research and Business Foundation, Seoul (KR)

(72) Inventor: Suah Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 372 days.

(21) Appl. No.: 17/351,524

(22) Filed: Jun. 18, 2021

(65) Prior Publication Data

US 2022/0094988 A1 Mar. 24, 2022

(30) Foreign Application Priority Data

Sep. 24, 2020 (KR) .................. 10-2020-0124272
Dec. 4, 2020 (KR) .................. 10-2020-0168530

(51) Int. Cl.
*H04N 19/625* (2014.01)
*H04N 19/124* (2014.01)
*H04N 19/182* (2014.01)
*H04N 19/176* (2014.01)

(52) U.S. Cl.
CPC ......... *H04N 19/625* (2014.11); *H04N 19/124* (2014.11); *H04N 19/176* (2014.11); *H04N 19/182* (2014.11)

(58) Field of Classification Search
CPC .. H04N 19/625; H04N 19/124; H04N 19/176; H04N 19/182; H04N 19/61; H04N 19/157; H04N 19/18

USPC ......................................................... 382/233
See application file for complete search history.

(56) References Cited

U.S. PATENT DOCUMENTS

| 5,774,634 | A * | 6/1998 | Honma | H04N 19/98 |
| | | | | 358/1.9 |
| 5,799,111 | A * | 8/1998 | Guissin | H04N 19/86 |
| | | | | 358/463 |
| 7,408,991 | B2 * | 8/2008 | Hourunranta | H04N 19/527 |
| | | | | 382/250 |
| 2002/0041716 | A1 * | 4/2002 | Bruna | H04N 19/186 |
| | | | | 375/E7.157 |
| 2003/0035586 | A1 * | 2/2003 | Chou | H04N 19/527 |
| | | | | 382/268 |
| 2004/0101055 | A1 * | 5/2004 | Hourunranta | H04N 19/89 |
| | | | | 725/144 |
| 2013/0215971 | A1 * | 8/2013 | Regunathan | H04N 19/86 |
| | | | | 375/240.18 |
| 2018/0173993 | A1 * | 6/2018 | Cogranne | G06V 10/431 |
| 2020/0059670 | A1 | 2/2020 | Kiser et al. | |

FOREIGN PATENT DOCUMENTS

| KR | 10-0620537 B1 | 9/2006 |
| KR | 10-0745429 B1 | 8/2007 |
| KR | 10-2007-0090168 A | 9/2007 |
| KR | 10-2020-0051850 A | 5/2020 |

* cited by examiner

*Primary Examiner* — Ali Bayat
(74) *Attorney, Agent, or Firm* — NSIP Law

(57) ABSTRACT

An apparatus and method for compressing Joint Photographic Experts Group (JPEG) images estimates a quantized DC coefficient of a target block to be decoded using AC coefficients of the target block and a pixel value of already decoded neighboring block adjacent to the target block, thereby reducing the encoded file size while maintaining the JPEG file format.

8 Claims, 2 Drawing Sheets

APPARATUS AND METHOD FOR COMPRESSING JPEG IMAGES

CROSS-REFERENCE TO RELATED APPLICATIONS

This application claims the benefit under 35 USC § 119(a) of Korean Patent Application No. 10-2020-0124272 filed on Sep. 24, 2020, and Korean Patent Application No. 10-2020-0168530 filed on Dec. 4, 2020, in the Korean Intellectual Property Office, the entire disclosures, all of which, are incorporated herein by reference for all purposes.

TECHNICAL FIELD

The present disclosure relates to an image compression apparatus, and more particularly, to an apparatus and method for compressing Joint Photographic Experts Group (JPEG) images in which a quantized DC coefficient of a target block to be decoded is estimated using AC coefficients of the target block and a pixel value of an already decoded neighboring block adjacent to the target block, thereby reducing the encoded file size while maintaining the JPEG file format.

BACKGROUND ART

According to the existing video playing method, the whole compressed video is decoded and copied to a large memory, and data at a location to play is copied to a frame memory and outputted on a display screen.

Since it is necessary to decode the compressed video stream at a time and store the whole decoded video in the memory, when the video resolution is very high, the required amount of memory is very large, so it cannot be used where the system resources are limited.

Joint Photographic Experts Group (JPEG) which is the most common image format is block based compression, and to play a block of compressed data stream at a target location for decoding, it involves finding the corresponding location while scanning from the beginning of a file and restoring.

Since the JPEG image format focuses on encoding based on encoding of quantized DCT coefficients, encoded images are generated with a significant increase in file size.

When the file size of JPEG images increases, Social Networking Services (SNS) and cloud services have an increasing burden on storing images with the increasing stored JPEG images.

RELATED LITERATURES

Patent Literatures (Patent Literature 0001) Korean Patent No. 10-0620537

DISCLOSURE

Technical Problem

To solve the above-described problem, the present disclosure is directed to providing an apparatus and method for compressing Joint Photographic Experts Group (JPEG) images in which a quantized DC coefficient of a target block to be decoded is estimated using AC coefficients of the target block and a pixel value of an already decoded neighboring block adjacent to the target block, thereby reducing the encoded file size while maintaining the JPEG file format.

Technical Solution

To achieve the above-described object, an apparatus for compressing Joint Photographic Experts Group (JPEG) images according to the feature of the present disclosure includes a decoding unit to decode a pixel at a specific block location (x, y) to generate a quantized DC coefficient, predict an estimated quantized DC coefficient of a target block to be decoded using quantized AC coefficients of the target block and a pixel value of a decoded block adjacent to the target block, and calculate an estimation error value which is the quantized DC coefficient minus the estimated quantized DC coefficient, and an encoding unit to encode the estimation error value by Huffman coding.

A method for compressing JPEG images according to the feature of the present disclosure includes decoding a pixel at a specific block location (x, y) to generate a quantized DC coefficient, predicting an estimated quantized DC coefficient of a target block to be decoded using quantized AC coefficients of the target block and a pixel value of a decoded block adjacent to the target block, calculating an estimation error value which is the quantized DC coefficient minus the estimated quantized DC coefficient, and encoding the estimation error value by Huffman coding.

Advantageous Effects

By the above-described configuration, the present disclosure reduces the encoded file size while maintaining the Joint Photographic Experts Group (JPEG) file format by estimating a quantized DC coefficient of a target block to be decoded using AC coefficients of the target block and a pixel value of an already decoded neighboring block adjacent to the target block.

BEST MODE

Unless the context clearly indicates otherwise, the term "comprises" when used in this specification, specifies the presence of stated elements, but does not preclude the presence or addition of one or more other elements.

Figure 1:
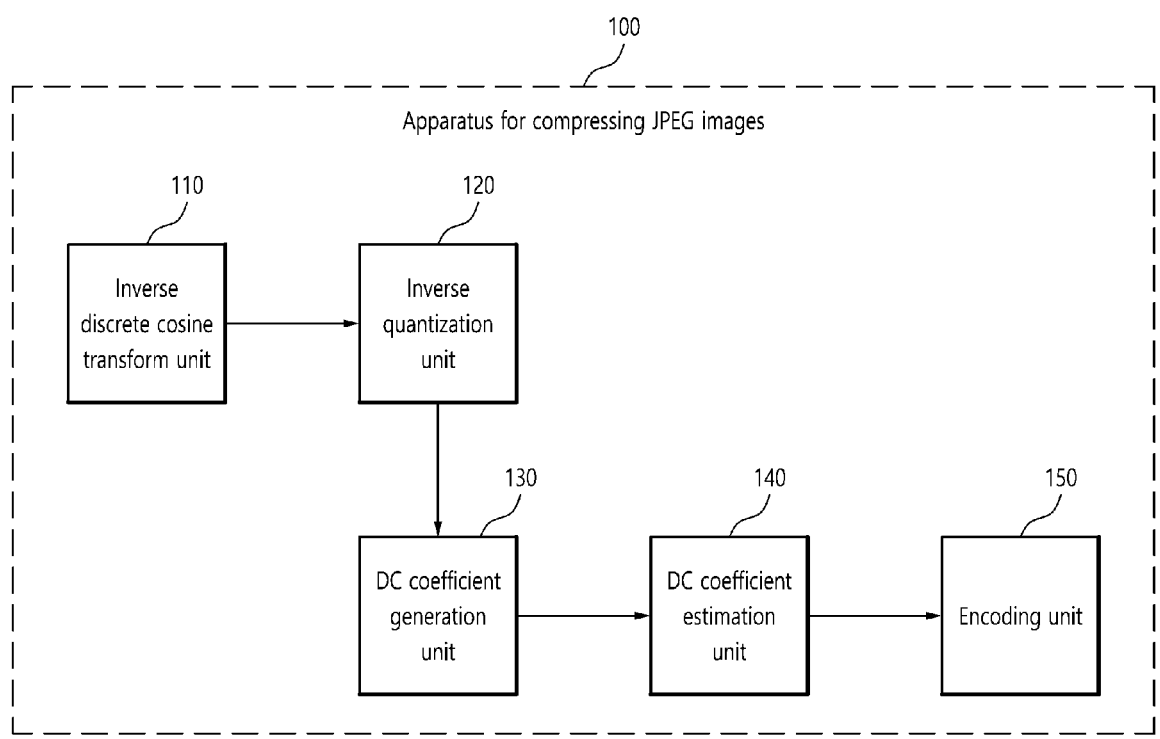
FIG. 1 is a diagram showing a configuration of an apparatus for compressing JPEG images according to an embodiment of the present disclosure.

FIG. 1 is a diagram showing a configuration of an apparatus for compressing Joint Photographic Experts Group (JPEG) images according to an embodiment of the present disclosure.

Each pixel of an image produced by JPEG image compression is divided into a macro block of 8×8 pixels, each block is provided with 64 inputs of the Discrete Cosine Transform (DCT) function, and one block includes a set of 64 coefficients composed of one DC component and 63 AC components by the DCT process.

According to an embodiment of the present disclosure, the apparatus 100 for compressing JPEG images includes an inverse discrete cosine transform unit 110, an inverse quantization unit 120, a DC coefficient generation unit 130, a DC coefficient estimation unit 140 and an encoding unit 150.

The apparatus 100 for compressing JPEG images estimates a quantized DC coefficient $D_{0,0}$ to increase the total compression rate, and reduces the file size by the quantized DC estimation.

The apparatus 100 for compressing JPEG images predicts the quantized DC coefficient $D_{0,0}$ using quantized AC coefficients and an already decoded neighboring JPEG block.

The inverse discrete cosine transform unit 110 generates an 8×8 block of decoded pixel values P of the quantized DCT coefficients D through the idct function based on the following Equations 1 and 2.

$$p = [idct(QF \circ D)] + 128^{8 \times 8} \quad \text{[Equation 1]}$$

where QF is a quantization factor, $\circ$ is an element-by-element multiplication, and [x] is a function of rounding the element of x to the nearest integer.

The inverse discrete cosine transform (IDCT) function is defined as below.

idct: G→g, where $G_{u,v} \in G$ is the DCT coefficient at block location (u, v).

$g_{x,y} \in g$ is the decoded pixel value at block location (x, y).

$$g_{x,y} = \sum_{u=0}^{7} \sum_{v=0}^{7} \frac{\alpha_u \alpha_v G_{u,v}}{4} \cos\left(\frac{(2x+1)u\pi}{16}\right) \cos\left(\frac{(2y+1)v\pi}{16}\right) \quad \text{[Equation 2]}$$

where $$\alpha_u = \begin{cases} \frac{1}{\sqrt{2}} & u = 0 \\ 1 & \text{else} \end{cases}$$

where $\alpha_u$, $\alpha_v$ are scaling factors applied to idct according to the u or v value.

The inverse quantization unit 120 generates an 8×8 block of decoded pixel values by partially decoding by the following Equations 3, 4 and 5 including the quantized DC coefficient, the quantized AC coefficients and the IDCT function.

The partially decoding refers to applying inverse quantization and idct function after substituting '0' for a coefficient value of no interest.

When decoding is performed as described above, the inverse quantization unit 120 may separate the quantized DC and AC components indicated as DC and AC. First, idct is a linear function, and D of Equation 1 may be decomposed into DC component and AC component.

$$p = [idct(QF \circ DC^{8 \times 8}) + idct(QF \circ AC^{8 \times 8})] + \quad \text{[Equation 3]}$$
$$128^{8 \times 8} = [p^{DC} + p^{AC}] + 128^{8 \times 8}$$

where $p^{DC} = idct(QF \circ DC^{8 \times 8})$ is a block of pixels partially decoded using the DC matrix, $DC^{8 \times 8}$ is an 8×8 block of DC components in the quantized DCT coefficients D, $AC^{8 \times 8}$ is an 8×8 block of AC components in the quantized DCT coefficients D, and p is an 8×8 block of decoded pixels.

$$QF \circ DC^{8 \times 8} = \begin{bmatrix} QF_{0,0}D_{0,0} & 0 & \cdots & 0 \\ 0 & 0 & \cdots & 0 \\ \vdots & \vdots & \ddots & \vdots \\ 0 & 0 & \cdots & 0 \end{bmatrix} \quad \text{[Equation 4]}$$

where $D_{x,y}$ denotes the quantized DCT coefficient D at location (x, y), and $QF_{x,y}$ denotes the quantization table of 8×8 block at location (x, y).

$p^{AC} = idct(QF \circ AC^{8 \times 8})$ denotes the pixel block partially decoded using the AC matrix.

$$QF \circ AC^{8 \times 8} = \begin{bmatrix} 0 & QF_{0,1}D_{0,1} & \cdots & QF_{0,7}D_{0,7} \\ QF_{1,0}D_{1,0} & QF_{1,1}D_{1,1} & \cdots & QF_{1,7}D_{1,7} \\ \vdots & \vdots & \ddots & \vdots \\ QF_{7,0}D_{7,0} & QF_{7,1}D_{7,1} & \cdots & QF_{7,7}D_{7,7} \end{bmatrix} \quad \text{[Equation 5]}$$

The decoded quantized DC pixel value $p_{x,y}^{DC}$ is the result of decoding the pixel at the specific block location (x, y) in the quantized DC component.

The DC coefficient generation unit 130 calculates $p_{x,y}^{DC}$ as represented in the following Equation 6 by applying idct to $DC^{8 \times 8}$ in Equation 3.

$$p_{x,y}^{DC} = \frac{\frac{1}{\sqrt{2}}\frac{1}{\sqrt{2}}QF_{0,0} \times D_{0,0}}{4}\cos(0)\cos(0) = \frac{QF_{0,0} \times D_{0,0}}{8} \quad \text{[Equation 6]}$$

Equation 6 shows that the quantized DC coefficient $D_{0,0}$ contributes equally to each pixel irrespective of location (x, y). To calculate $D_{0,0}$, Equation 6 is rewritten so that it reads the following Equation 7.

$$D_{0,0} = \frac{8}{QF_{0,0}} \times p_{x,y}^{DC} \quad \text{[Equation 7]}$$

Equation 7 shows that if $p_{x,y}^{DC}$ can be predicted, $D_{0,0}$ can be estimated.

The DC coefficient generation unit 130 generates the quantized DC coefficient $D_{0,0}$ using Equation 7.

The DC coefficient estimation unit 140 predicts the partially decoded quantized DC coefficient.

That is, the DC coefficient estimation unit 140 calculates an approximate value $p^{DC}$ using Equation 3 by the following Equation 8.

$$p^{DC} \approx [p - p^{AC} - 128^{8 \times 8}] \quad \text{[Equation 8]}$$

Equation 8 is rewritten in terms of the specific location (x, y) so that it reads the following Equation 9.

$$p_{x,y}^{DC} \approx [p_{x,y} - p_{x,y}^{AC} - 128] \quad \text{[Equation 9]}$$

Equation 9 may be used to predict $p_{x,y}^{DC}$ by sampling $p_{x,y}$ at the specific block location.

Figure 2:
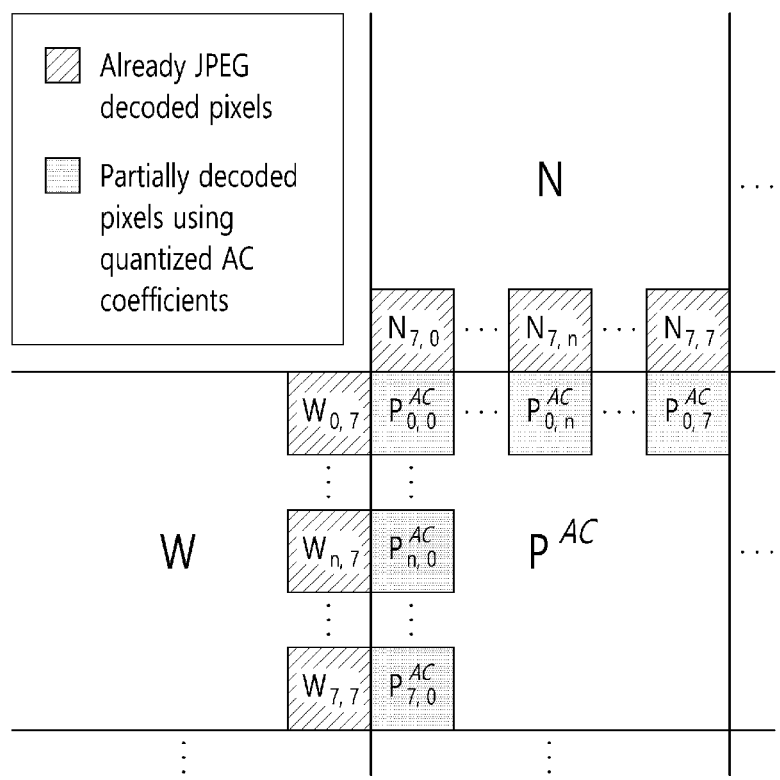
FIG. 2 is a conceptual diagram showing a method for estimating a decoded quantized DC according to an embodiment of the present disclosure.

FIG. 2 is a conceptual diagram showing a method for estimating the decoded quantized DC according to an embodiment of the present disclosure.

FIG. 2 shows blocks used in $p_{x,y}$ being sampled.

$p^{AC}$ is a target block to be decoded and quantized AC coefficients used to estimate the quantized DC coefficient $D_{0,0}$, 'N' denotes an already decoded first neighboring block positioned on the northern side of $p^{AC}$, and 'W' denotes an already decoded second neighboring block positioned on the western side of $p^{AC}$.

The pixels may have similar values to neighboring pixels. $n \in \{0, \ldots, 7\}$, $N_{7,n}$ has a similar value to $p_{0,n}$, and $W_{n,7}$ has a similar value to $p_{n,0}$.

The DC coefficient estimation unit 140 uses 16 neighboring pixels as a predicted value for $p_{x,y}$, and may generate the predicted value $\hat{p}_{x,y}^{DC}$ by the following Equation 10, by calculating an average value of the target block to be decoded using an average value of the already decoded first neighboring block and an average value of the already decoded second neighboring block.

$$\hat{p}_{x,y}^{DC} = \frac{\sum_{n=0}^{7}\left(N_{7,n} - p_{0,n}^{AC} - 128\right) + \left(W_{n,7} - p_{n,0}^{AC} - 128\right)}{16} = $$

$$\frac{\sum_{n=0}^{7} N_{7,n} - p_{0,n}^{AC} + W_{n,7} - p_{n,0}^{AC}}{16} - 128$$

[Equation 10]

$\{N_{7,n}\}_{n=0}^{7}$ is a nearest pixel to the target block on the northern side among the decoded pixel values, $\{W_{n,7}\}_{n=0}^{7}$ is a nearest pixel to the target block on the western side among the decoded pixel values.

$\{p_{0,n}^{AC}\}_{n=0}^{7}$ is a pixel near to block N among the pixels of the target block decoded using only the quantized AC.

$\{p_{n,0}^{AC}\}_{n=0}^{7}$ is a pixel near to block W among the pixels of the target block decoded using only the quantized AC.

It is required to know the quantized DC of the target block to decode the target block, but under the assumption that the quantized DC of the target block is unknown, the DC coefficient estimation unit 140 performs JPEG decoding with the quantized DC value of the target block set to 0 while maintaining only the quantized AC values of the target block.

The DC coefficient estimation unit 140 may generate the following Equation 11 by substituting $\hat{p}_{x,y}^{DC}$ of Equation 10 into Equation 7.

$$\hat{D}_{0,0} = \left[\frac{8 \times \sum_{n=0}^{7} N_{7,n} - p_{0,n}^{AC} + W_{n,7} - p_{n,0}^{AC}}{QF_{0,0} \times 16} - 128\right]$$

[Equation 11]

The DC coefficient estimation unit 140 predicts an estimated quantized DC coefficient $\hat{D}_{0,0}$ of the target block through Equation 11, and calculates an estimation error value which is the quantized DC coefficient $D_{0,0}$ minus the estimated quantized DC coefficient $\hat{D}_{0,0}$ and stores it.

The JPEG standard encodes using the Huffman table after applying Differential Pulse Code Modulation (DPCM) on the quantized DC coefficient.

However, the encoding unit 150 of the present disclosure does not apply DPCM, and directly encodes the estimation error value.

The encoding unit 150 encodes the estimation error value according to the size using Huffman coding, and encodes the AC symbol according to the size of non-zero AC and run-length coding using Huffman coding. This encoding process is repeated over all the blocks.

The estimation error value is Huffman encoded by its size, while the AC symbol is Huffman encoded by its size and run-length.

Accordingly, it is necessary to encode with maximum entropy while preventing the increase in file size due to encoding.

The method for compressing JPEG images of the present disclosure provides compressed JPEG encoding having the lossless file size reduction function by up to 5.75%. This method uses the inefficiency of JPEG when compressing the quantized DC, and carefully integrates the quantized DC estimation system with the file format maintaining encoding, thereby reducing the encoded file size while maintaining the file format.

While the embodiments of the present disclosure have been hereinabove described in detail, the scope of protection of the present disclosure is not limited thereto and encompasses many modifications and changes made by those skilled in the art using the basic concept of the present disclosure defined in the appended claims.

DETAILED DESCRIPTION OF MAIN ELEMENTS

100: Apparatus for compressing JPEG images
110: Inverse discrete cosine transform unit
120: Inverse quantization unit
130: DC coefficient generation unit
140: DC coefficient estimation unit
150: Encoding unit

The invention claimed is:

1. An apparatus for compressing Joint Photographic Experts Group (JPEG) images, comprising:
   a decoding unit to decode a pixel at a specific block location (x, y) to generate a quantized DC coefficient, predict an estimated quantized DC coefficient of a target block to be decoded using quantized AC coefficients of the target block and a pixel value of a decoded block adjacent to the target block, and calculate an estimation error value which is the quantized DC coefficient minus the estimated quantized DC coefficient; and
   an encoding unit to encode the estimation error value by Huffman coding.

2. The apparatus for compressing JPEG images according to claim 1, wherein the decoding unit further comprises an Inverse Discrete Cosine Transform (IDC) unit to generate an 8×8 block of decoded pixel values (P) of the quantized DCT coefficients (D) through an IDCT function using the following Equation 1:

$$p = [idct(QF \odot D)] + 128^{8 \times 8}$$

[Equation 1]

where QF is a quantization factor, o is an element-by-element multiplication, and [x] is a function of rounding an element of x to a nearest integer.

3. The apparatus for compressing JPEG images according to claim 1, wherein the decoding unit further comprises an inverse quantization unit to generate an 8×8 block of decoded pixel values (P) using the following Equation 2 including a first pixel block partially decoded using a DC matrix and a second pixel block partially decoded using an AC matrix:

$$p = \left[idct(QF \circ DC^{8 \times 8}) + idct(QF \circ AC^{8 \times 8})\right] +$$

$$128^{8 \times 8} = \left[p^{DC} + p^{AC}\right] + 128^{8 \times 8}$$

[Equation 2]

where $p^{DC} = idct(QF \odot DC^{8 \times 8})$ is a pixel partially decoded using the DC matrix, $DC^{8 \times 8}$ is an 8×8 block of DC components in the quantized DCT coefficients (D), $QF_{x,y}$ is a quantization table of 8×8 block at location (x, y), $p^{AC}=\text{idct}(QF \bigcirc AC^{8\times 8})$ is a pixel block partially decoded using the AC matrix, and $AC^{8\times 8}$ is an 8×8 block of AC components in the quantized DCT coefficients (D).

4. The apparatus for compressing JPEG images according to claim 1, wherein the decoding unit further comprises a DC coefficient generation unit to generate the quantized DC pixel value ($p_{x,y}^{DC}$) by decoding the pixel at the specific block location (x, y) in the quantized DC component using the following Equation 3, and generate the quantized DC coefficient ($D_{0,0}$) by decoding the pixel at the specific block location (x, y) using the following Equation 4 rewritten from the Equation 3:

$$p_{x,y}^{DC} = \frac{\frac{1}{\sqrt{2}}\frac{1}{\sqrt{2}}QF_{0,0} \times D_{0,0}}{4}\cos(0)\cos(0) = \frac{QF_{0,0} \times D_{0,0}}{8} \quad \text{[Equation 3]}$$

$$D_{0,0} = \frac{8}{QF_{0,0}} \times p_{x,y}^{DC}. \quad \text{[Equation 4]}$$

5. The apparatus for compressing JPEG images according to claim 4, wherein the decoding unit further comprises a DC coefficient estimation unit to predict the estimated quantized DC coefficient of the target block as an average value of pixels of the target block to be decoded using an average of pixels of the decoded block adjacent to the target block.

6. The apparatus for compressing JPEG images according to claim 5, wherein the DC coefficient estimation unit generates a predicted quantized DC pixel value ($\hat{p}_{x,y}^{DC}$) by decoding the pixel at the specific block location (x, y) by the following Equation 5:

$$\hat{p}_{x,y}^{DC} = \frac{\sum_{n=0}^{7}\left(N_{7,n} - p_{0,n}^{AC} - 128\right) + \left(W_{n,7} - p_{n,0}^{AC} - 128\right)}{16} = \quad \text{[Equation 5]}$$

-continued
$$\frac{\sum_{n=0}^{7} N_{7,n} - p_{0,n}^{AC} + W_{n,7} - p_{n,0}^{AC}}{16} - 128$$

where $N_{7,n}$ is a nearest pixel on a northern side of the target block among the decoded pixel values, $W_{n,7}$ is a nearest pixel on a western side of the target block among the decoded pixel values, $p_{0,n}^{AC}$ is a pixel adjacent to block N among the pixels of the target block decoded using only the quantized AC, and $p_{n,0}^{AC}$ is a pixel adjacent to block W among the pixels of the target block decoded using only the quantized AC.

7. The apparatus for compressing JPEG images according to claim 6, wherein the DC coefficient estimation unit generates the following Equation 6 by substituting the above Equation 5 into the above Equation 4, and predicts the estimated quantized DC coefficient ($\hat{D}_{0,0}$) through the Equation 6:

$$\hat{D}_{0,0} = \left[\frac{8 \times \sum_{n=0}^{7} N_{7,n} - p_{0,n}^{AC} + W_{n,7} - p_{n,0}^{AC}}{QF_{0,0} \times 16} - 128\right]. \quad \text{[Equation 6]}$$

8. A method for compressing Joint Photographic Experts Group (JPEG) images, comprising:
decoding a pixel at a specific block location (x, y) to generate a quantized DC coefficient;
predicting an estimated quantized DC coefficient of a target block to be decoded using quantized AC coefficients of the target block and a pixel value of a decoded block adjacent to the target block;
calculating an estimation error value which is the quantized DC coefficient minus the estimated quantized DC coefficient; and
encoding the estimation error value by Huffman coding and run-length coding.

* * * * *